US009117188B2

(12) United States Patent
Johri et al.

(10) Patent No.: US 9,117,188 B2
(45) **Date of Patent: *Aug. 25, 2015**

(54) METHOD AND SYSTEM FOR MULTIMEDIA CONTACT ROUTING

(71) Applicant: Verizon Patent and Licensing, Inc., Basking Ridge, NJ (US)

(72) Inventors: Priyank Johri, Coppell, TX (US); Nikhil Dhoble, Plano, TX (US); Apurva J. Sheth, Plano, TX (US); DhivyaPriya Venkatachalam, Pradesh (IN); Santosh Mohan Bijur, Hyderabad (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/101,149

(22) Filed: Dec. 9, 2013

(65) Prior Publication Data

US 2014/0164041 A1 Jun. 12, 2014

Related U.S. Application Data

(63) Continuation of application No. 11/612,266, filed on Dec. 18, 2006, now Pat. No. 8,605,886.

(51) Int. Cl.

| | |
|---|---|
| ***H04M 3/00*** | (2006.01) |
| ***H04M 5/00*** | (2006.01) |
| ***G06Q 10/06*** | (2012.01) |

(52) U.S. Cl.
CPC ........ *G06Q 10/063114* (2013.01); *G06Q 10/06* (2013.01)

(58) Field of Classification Search
USPC ............. 379/265.11, 265.01, 265.05, 265.12, 379/266.01
See application file for complete search history.

(56) References Cited

U.S. PATENT DOCUMENTS

| | | | | |
|---|---|---|---|---|
| 6,064,730 | A * | 5/2000 | Ginsberg | 379/265.09 |
| 6,144,971 | A * | 11/2000 | Sunderman et al. | 715/205 |
| 6,704,409 | B1 * | 3/2004 | Dilip et al. | 379/265.02 |
| 2002/0067821 | A1 * | 6/2002 | Benson et al. | 379/265.02 |
| 2006/0167971 | A1 | 7/2006 | Breiner | |
| 2007/0201673 | A1 * | 8/2007 | Annadata et al. | 379/265.01 |

* cited by examiner

*Primary Examiner* — Quynh Nguyen

(57) ABSTRACT

A system and method may include processing a task assignment request comprising a task type corresponding to a task and querying a database based on the task assignment request and on the task type to identify an agent profile and agent status information for the identified agent profile, the agent profile comprising identification information to identify an agent workstation. The system and method may further include determining whether to generate assignment information for assigning the task to the agent workstation based on the agent status information.

22 Claims, 5 Drawing Sheets

METHOD AND SYSTEM FOR MULTIMEDIA CONTACT ROUTING

CROSS REFERENCE TO RELATED APPLICATION

The subject application is a Continuation Application of U.S. application Ser. No. 11/612,266, filed Dec. 18, 2006, now U.S. Pat. No. 8,605,886, which is hereby incorporated by reference in its entirety.

BACKGROUND INFORMATION

Effective communication is important for companies responding to the needs of their customers. Customers often use the telephone to call a company for ordering a service or for requesting assistance with a problem. Employing human customer service agents to respond to customer needs is expensive and hence companies seek to efficiently use their human capital. Companies may use call centers to distribute customer calls to customer service agents in an attempt to meets customer needs.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF EXEMPLARY EMBODIMENTS

A system and method according to exemplary embodiments of the present invention may provide for processing a task assignment request including a task type corresponding to a task, querying a database based on the task assignment request and on the task type to identify an agent profile and agent status information for the identified agent profile, the agent profile comprising identification information to identify an agent workstation, and determining whether to generate assignment information for assigning the task to the agent workstation based on the agent status information.

The description below provides a discussion of servers, computers, and other devices that may include one or more modules. As used herein, the term "module" may be understood to refer to software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Figure 1:
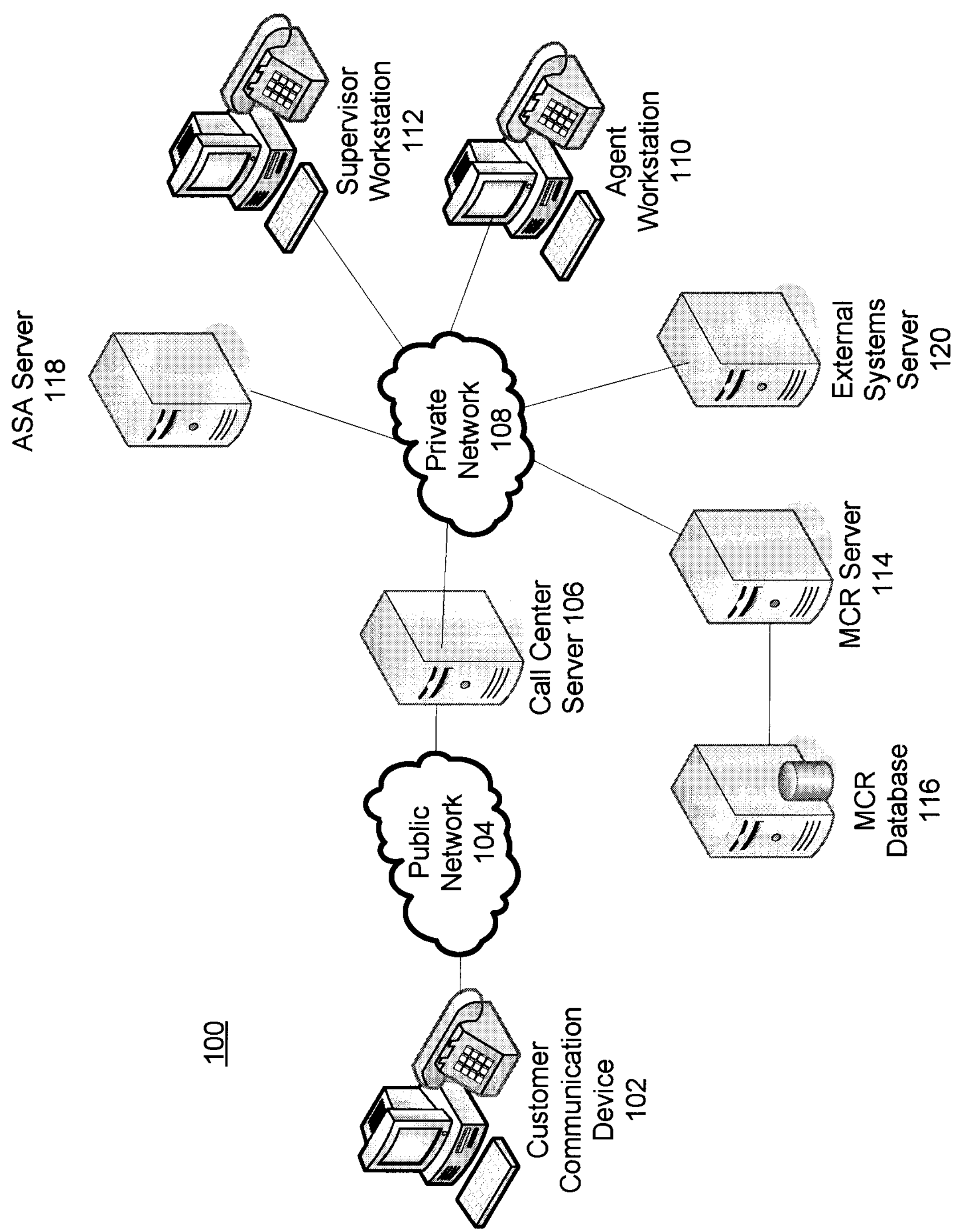
FIG. 1 illustrates an exemplary system for processing and assigning tasks, according to an exemplary embodiment of the present invention.

FIG. 1 illustrates an exemplary system 100 for processing and assigning tasks, according to an exemplary embodiment of the present invention. The system 100 may efficiently process and distribute real-time and non-real time tasks to customer service agents based on communications received from customers over various types of media. The system 100 also may monitor schedules of the agents and may generate reports for monitoring agent performance.

The system 100 may include a customer communication device 102 coupled to a public network 104. The customer communication device 102 may be a telephone, a computer, a SIP client, a video phone, other devices suitable for transmitting and receiving analog or digital voice or digital data over the public network 104, and/or combinations thereof. The public network 104 may be a telephony network, such as a public switched telephone network (PSTN), a plain old telephone service (POTS) network, or other known telephony networks. The public network 104 also may be a data network, such as an Internet Protocol (IP) network, an asynchronous transport mode (ATM) network, or other known data networks. The public network 104 also may be a combination of one or more telephony networks and one or more data networks.

The customer communication device 102 may forward a non-real-time message or may generate a communication request for establishing a real-time communication session with the call center server 106. The non-real-time message may be an email, a web order entered at a company's website, or electronic bill payment, for example. The communication request may be a sequence of digits dialed at a telephone, or a SIP Invite request, for example. The real-time communication session may be a telephone call, a Session Initiation Protocol (SIP) dialog, a voice over data session (e.g., Voice over IP), a video teleconference, or other suitable communication session for transporting voice, video, audio, and/or digital data over a network.

The call center server 106 may function as a firewall between the public network 104 and private network 108 to prevent unwanted voice and/or data traffic from entering the private network 108. The private network 108 may be a private branch exchange, a local area network, other suitable network for transporting voice signals and/or digital data, and/or combinations thereof.

The call center server 106 may receive and forward the non-real-time message to an appropriate destination for processing, such as the external systems server 120. Also, the call center server 106 may establish a communication session upon receipt of the communication request, and may route the communication session to an appropriate agent workstation 110 for processing. A workstation may be a desktop computer, a laptop computer, a computer, a phone, a video phone, other audio, video, or text displaying devices, and/or combinations thereof. FIG. 1 depicts a single agent workstation 110; however, the agent workstation 110 may represent more than a single workstation. It is noted that system 100 may include additional devices not shown, and the devices shown may be integrated and/or divided. The devices in system 100 also may be rearranged to have certain devices remote or local to one another. The devices in system 100 also may include redundant devices. Other modifications also may be made.

The real-time communication sessions and the non-real-time messages may be real-time tasks and non-real-time tasks requiring response by a customer service agent. For example, real-time tasks may be telephone calls, chat sessions (e.g., typing on a keyboard, etc.), other real-time communication with a customer, and/or combinations thereof. Non-real-time tasks may be responding to customer emails, processing billing issues, and processing network orders (e.g., orders through a company's web site).

The call center server 106 may route assigned real-time communication sessions to a particular agent workstation 110 and may route non-real-time messages to the external systems server 120. Before the real-time communication session is routed to a particular agent workstation 110, the call center server 106 may receive assignment information from the Multimedia Contact Routing (MCR) server 114 to determine to which agent to route the real-time communication session. The external systems server 120 also may forward non-real-time messages to the agent workstations 110 based on the assignment information. The assignment information may identify an address of the agent workstation 110 (e.g., phone number, IP address, etc.) and agent identification information uniquely identifying a particular agent, for example. The MCR server 114 may assign an agent to the task after determining that the agent may properly process the task based on the skill set of the agent. For example, if the communicate session is a chat session, the call center server 106 may route the chat session to agents with sufficient typing ability for responding to the customer. The MCR server 114 may forward the assignment information to the call center server 106 as a flat file, for example. The MCR server 114 also may forward received messages to a framework for translating the message into a format acceptable to the MCR server 114 and/or to the MCR database 116. For example, the MCR Server 114 may forward received messages to a struts framework for formatting.

After receiving the assignment information, the call center server 106 may route the real-time communication session to the agent at the agent workstation 110 identified in the assignment information. After receiving the assignment information, the external systems server 120 may route the non-real-time message to the agent at the agent workstation 110 identified in the assignment information.

The agent workstation 110 and supervisor workstation 112 may present agents and supervisors various graphical user interfaces (GUIs) for processing tasks and for displaying reports received from the MCR server 114 based on various performance metrics. A user may log into a workstation 110 or 112, and the workstation 110 or 112 may forward identification information to the MCR server 114 for identifying the user as either an agent or a supervisor, which are respectively designated as the agent workstation 110 and the supervisor workstation 112 in FIG. 1. The agent workstation 110 and the supervisor workstation 112 may access external systems server 120 for processing non-real-time tasks.

The external systems server 120 may communicate with the agent workstation 110 and/or the supervisor workstation 112 for forwarding non-real-time messages to permit of processing non-real-time tasks. Both the agent workstation 110 and the supervisor workstation 112 may process email, network orders, and bill payments based on data stored in the external systems server 120. For example, the external systems server 120 may use eGain email service, eCORS web ordering server, and OneBill billing service.

The agent workstation 110 and supervisor workstation 112 also may query the MCR server 114 to obtain reports. For example, the agent and/or the supervisor may obtain current and historical performance reports, and may view the agent's compliance with the agent's work schedule. The supervisor may monitor each agent's current and pending workload assigned to the supervisor and whether the agents are completing the tasks in a timely manner. The reports are described in further detail below.

Figure 2:
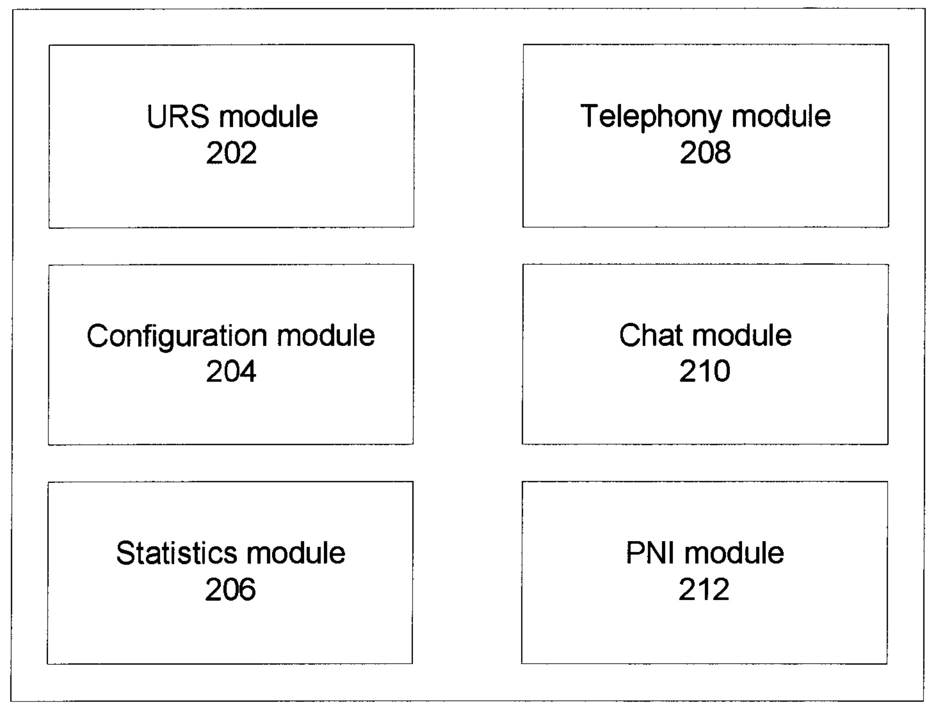
FIG. 2 illustrates exemplary modules included in a call center server, according to an exemplary embodiment of the present invention.

FIG. 2 illustrates various modules included in the call center server 106 for processing communication requests and non-real-time messages, and for routing real-time communication sessions to agent workstation 110, according to an exemplary embodiment of the present invention. The call center server 106 may include a URS module 202, a configuration module 204, a statistics module 206, a telephony module 208, a chat module 210, and an interface module 212. It is noted that modules 202-212 are exemplary. The functions performed by the modules 202-212, as described herein, also are exemplary. The modules 202-212 may be combined, divided, separated, integrated, and/or combinations thereof. The modules 202-212 also may be local or remote to one another.

The URS module 202 may receive the assignment information from the MCR server 114 and may use the assignment information for scheduling and routing the real-time communication sessions to the agent workstations 110. After routing, the URS module 202 may retain assigned data identifying which real-time tasks have been assigned to which agents. The URS module 202 may forward the assigned data to the MCR server 114 for updating agent status information in the MCR database 116. Once the agent has completed a real-time task, the URS module 202 may forward completed data to the MCR server 114 for updating the agent status information in the MCR database 116. The MCR server 114 may use the assigned data and the completed data to update agent status information for identifying the status of the agents and for determining whether to assign a new task to an agent.

The telephony module 208 may receive and process phone calls (e.g., conventional telephone calls, VoIP calls, etc.) received from the customer communication device 102 over the public network 104. The telephony module 208 may be communicatively coupled to a telephony switch (not shown) on the public network 104. For example, the switch may be a Rockwell Spectrum switch. When a call is received from the switch, the telephony module 208 may notify the URS module 202 of a pending call. The URS module 202 generate and forward a task assignment request to the MCR server 114, which may return assignment information assigning the real-time task to a particular agent workstation 110. The URS module 202 may then route the call to an agent at an agent workstation 110 over the private network 108 based on the assignment information.

When the agent accepts the call, the URS module 202 may notify the telephony module 208 to transfer the call to the agent workstation 116. If a first agent does not accept the call within a time interval (e.g., 3 seconds), the URS module 202 may forward a second task assignment request to the MCR server 114 and may route the call to a second agent at another agent workstation (not shown) based on second assignment information. This may repeat until an agent accepts the call.

After the call is accepted, the telephony module 208 may notify the URS module 202 of the agent accepting the phone call. The URS module 202 may then forward assigned data to the MCR server 114 for updating the agent status information to indicate that the agent is unavailable.

The chat module 210 may be an interface to a chat service for establishing a chat session (e.g., typing on a computer keyboard) over the public network 104 with the customer communication device 102. For example, the chat module 210 may be a multiple-switch (MS) T-Server. The chat module 210 may receive chat requests from the customer communication device 102 over the public network 104 desiring to establish a chat session with an agent. Upon receiving the chat request, the chat module 210 may forward a task assignment request to the MCR server 114, which may return assignment information for assigning the chat session to an agent. The chat module 210 may route the chat session to an agent at an agent workstation 110 based on the assignment information. To accept assignment of the chat session, the agent may select an accept icon displayed at the agent workstation 110. Once accepted, the chat module 210 may establish the chat session with the agent workstation 110 and may notify the URS module 202 of the established chat session. The URS module 202 may then forward assigned data to the MCR server 114 for updating the agent status information indicating that the agent is unavailable. If an agent has not been assigned to a real-time task, and no real-time tasks are pending that the agent may process, then the MCR server 114 may assign a non-real-time task to the agent, as will be discussed in further detail below.

The configuration module 204 may contain the configuration for the agents and task queues. The configuration module 204 may manage agent information. The agent configuration may be updated daily or whenever a change occurs. A task queue configuration of a queue module 516 can be updated by the supervisor using an administration GUI module 304, as discussed in further detail below.

For each task routed to an agent workstation 110 by the USR module 202, the statistics module 206 may track time information indicating the amount of time the assigned agent used to complete the assigned task. The statistics module 206 may report the time information to the MCR server 114.

The Private Network Interface (PNI) module 212 may be the interface of the call center server 114 with the private network 108. The PNI module 212 may forward and receive messages and events to and from the private network 108. For example, the messages may be Java Message Service (JMS) messages and events may be Java Remote Method Invocation (RMI) events.

Figure 3:
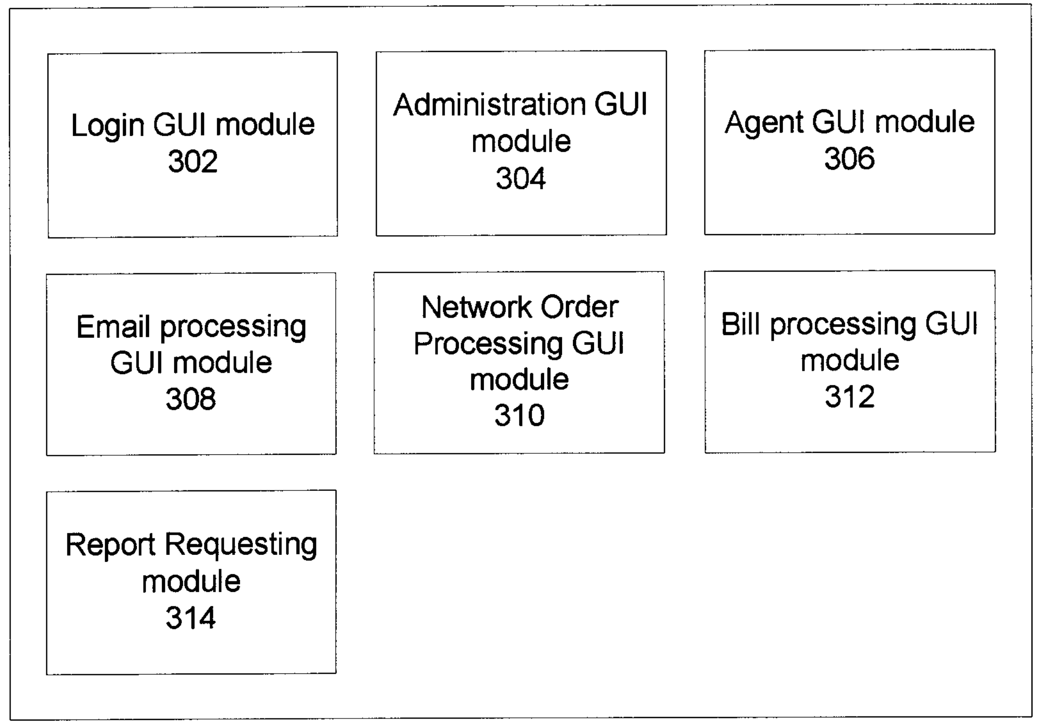
FIG. 3 illustrates exemplary modules included in a workstation, according to an exemplary embodiment of the present invention.

FIG. 3 illustrates various modules 302-314 implemented at the workstations 110 and 112, according to an exemplary embodiment of the present invention. The modules 302-314 may interact with the user and the other devices in the system 100. The modules 302-314 also may generate a GUI for the user, identify the user, process tasks, and request reports. The workstations 110 and 112 each may include a login module 302, an administration GUI module 304, an agent GUI module 306, an email processing GUI module 308, a network order processing GUI module 310, a bill processing GUI module 312, and a report requesting module 314. It is noted that modules 302-314 are exemplary. The functions performed by the modules 302-314, as described herein, are exemplary. The modules 302-314 may be combined, divided, separated, integrated, and/or combinations thereof. The modules 302-314 also may be local or remote to one another.

The login module 302 may present a GUI login screen to the user at workstations 110 and 112 for identifying and authenticating the user. The user may input identification information at the login screen for uniquely identifying the user. For example, the identification information may be a username and password typed by a user at a computer keyboard. The login module 302 also may include a unique address (e.g., telephone number, IP address, etc.) of the workstation in the identification information. The login module 302 may forward the identification information to the MCR server 114 to identify the user as a supervisor or an agent and to retrieve a supervisor profile or an agent profile from the MCR database 116. The MCR server 114 may then respectively update the agent profile and the supervisor profile with the identification information and may forward the supervisor profile or the agent profile to the login module 302. Based on the profile, the login module 302 may permit and may limit access of the user to various other modules implemented at the workstation 110 or 112.

For users identified as supervisors, the administration GUI module 304 may present a supervisor GUI for managing and monitoring performance of the agents assigned to the supervisor. The supervisor may use the supervisor GUI to input agent parameters and system parameters. The agent parameters may update an agent profile of an agent by identifying which task types may be assigned to an agent (i.e., task type parameters), from which jurisdictions an agent may process tasks (i.e., jurisdictional parameters), and a skill level of the agent (i.e., skill level parameters). The system parameters may update service levels based on task type for a particular jurisdiction (i.e., service level parameters), priority of non-real-time tasks by jurisdiction (i.e., priority parameters), and agent availability to adequately perform certain tasks (i.e. availability parameters). The system parameters may be set for a particular jurisdiction, for a particular supervisor, or globally. Once any of the parameters are updated, the administration GUI module 304 may forward the updated parameters to the MCR server 114 for updating the agent profile stored in the MCR database 116.

The jurisdictional parameters in an agent profile may indicate whether an agent is suitably trained for processing tasks received from a particular jurisdiction (e.g., NY, NE, NJ, PADE, Potomac, West, Level1 West, eBiz Level1, Encore, etc.). For example, the jurisdiction parameters may indicate that the agent may process tasks received from the NY jurisdiction, but not from any other jurisdiction.

The task type parameters in an agent profile may indicate which task types the agent is trained to perform. For example, the task types parameters may indicate whether the agent has passed training for responding to real-time tasks (e.g., phone calls, chat sessions, etc.) and/or for non-real-time tasks (e.g., email, fallout orders, onebill, etc.).

The skill level parameters in an agent profile may indicate a proficiency level (e.g., rookie, experienced, expert, etc.) of an agent for performing the different task types or knowledge of a particular jurisdiction. The skill level parameters may vary based on the proficiency of the agent at handling various tasks (e.g., email, chat, call, eCors, Onebill order), and also may vary based on the agent's knowledge of the requirements for a particular jurisdiction. The skill level parameters may range from a lowest level to a highest level. For example, the skill level may range from 1-10 with 1 being the lowest skill level and with 10 being the highest skill level. A 1 skill level may indicate no knowledge, and a 10 skill level may indicate expert knowledge of the task and/or of a particular jurisdiction. For example, the supervisor may use the skill level parameters to indicate that the agent is an expert typist and is well-qualified to communicate with a customer in a chat session. The skill level parameters also may designate agents as Support Specialists, Clerks, or Associates. The supervisor may update an agent's skill level parameters after the agent completes training indicating a certain proficiency level for handling a particular task type or knowledge of a particular jurisdiction.

Whenever a manager submits changes to agent parameters in an agent's profile, the administration GUI module 304 may prompt the supervisor to input their name and optionally a password. The administration GUI module 304 also may capture the date and time with the name entry to form an audit trail for auditing changes to the agent profile. The audit trail may be available indefinitely, or over a particular time interval (e.g., available for 12 months, for 2 years after employee separation from the employer, etc.).

The supervisor may update the system parameters to globally affect all of the agents processing tasks in the system 100 in a particular jurisdiction. The service level parameters may specify that tasks may be completed within a defined time interval for a particular jurisdiction by task type. For example, the service level parameters may specify that all emails from the NY jurisdiction must be completed within four minutes, and all web orders from the NY jurisdiction may be completed within 12 hours. The service level parameters also may be used to globally change service level requirements for all jurisdictions.

The routing priority parameters may modify routing priorities for non-real-time tasks based on task type and jurisdiction. For example, if a backlog of emails from a particular jurisdiction exists, the supervisor may modify the routing priority parameters to increase the priority of non-real-time tasks from that particular jurisdiction relative to non-real-time tasks from another jurisdiction. The MCR server 114 may use the routing priority parameters to assign agents to higher priority non-real-time tasks before assigning agents to the other non-real-time tasks.

The availability parameters may indicate whether sufficient agents are available to process tasks of a certain type. The supervisor may use the availability parameters to select whether an icon for a particular task type appears to a customer depending on whether one or more agents are logged in and have the skill set to handle a particular task type in a particular jurisdiction. For example, the ability of the customer to select a chat icon of a website may be dynamically controlled by the supervisor through using the availability parameters. The supervisor may use the availability parameters to enable, disable, or hide the task type icon by jurisdiction or by multiple jurisdictions. For example, if there are no agents capable of chatting in the NY jurisdiction, and an agent is logged in and can handle chat sessions in the Potomac jurisdiction, then the chat icon may appear for Potomac customers but not for NY customers.

The administration GUI module 304 also may permit supervisors to offer additional working hours to one or more of the agents. Additional working hours may include additional hours for part-time employees, and overtime for part-time and full-time employees, for example. The administration GUI module 304 may receive additional hours parameters from the supervisor identifying one or more agents for offering a number of additional hours to the agents based on a skill set of the agents. For example, the supervisor may offer 6 overtime hours to an agent with an expert skill level for responding to chat sessions from NJ customers.

The report requesting module 314 may permit the agent or the supervisor to obtain various reports from the MCR server 114. The report requesting module 314 is discussed further detail below with the MCR server 114.

The agent GUI module 306 may present a GUI to the agent at the agent workstation 110 for processing tasks assigned to the agent. The agent GUI module 306 may present an interface for processing real-time and non-real-time tasks assigned to the agent. For example, the agent GUI module 306 may display a click to chat icon on the GUI for agents capable of processing chat sessions based on the agent profile. The agent GUI may permit the user to enter various types of information discussed with the customer. For example, the agent may report technical problems a customer is experiencing with their service so that a technician may be sent to the customer premises.

The agent GUI module 306 also may present a task pause icon that the agent may select to temporarily stop work from being assigned to the agent. The agent may select the task pause icon when doing follow-up work after completing a task.

Additionally, the agent GUI module 306 may permit the agent to input unavailability information at the agent workstation 110. The unavailability information may be a list of reasons why the agent is not available (e.g., sick, break, etc.).

The agent GUI module 306 also may present pop-up windows to the agent at the agent workstation 110. The pop-up windows may be reminders for reminding the agent to take breaks, that the work shift has ended, etc. The pop-up window reminders also may display performance alerts. The performance alerts may indicate that an assigned task has not been completed within a designated time interval or that the agent has taken a longer break than permitted. For example, if agent has pressed the task pause icon for a time period longer than a time threshold set by the supervisor, a pop-up window may ask the agent to confirm that they are still in the task pause status. Also, when an agent ends a call and doesn't choose to be active for assignment of a new call, the agent GUI module 306 may log the agent out of their phone. If the agent is logged in to the MCR Server 114, but logged out of their phone, the agent GUI module 306 may generate a pop-up window alert for the user. For example, the agent may press certain key combinations on the agent's phone to log out of the phone. For tasks other than calls, when the agent does not complete a task within a performance time threshold, the agent GUI module 306 may display an indicator to the agent in the GUI. For example, the color of the GUI and a link in a task bar may change colors to alert the agent that they did not complete the assigned task within the performance time threshold.

The agent GUI module 306 also may present an additional hours offer pop-up window with an offer to work additional hours along with an accept icon and a decline icon if the supervisor decides to offer the particular agent additional hours. If an agent is away from the agent workstation 110 and is in a status other than active (e.g., on a lunch break, etc.) when the offer is received, then the agent GUI module 306 may instruct the agent workstation 110 to display the additional hours offer pop-up window once the agent becomes active (e.g., returns from the lunch break).

If the agent declines the additional hours, the agent GUI module 306 may forward decline information to the MCR server 114. The MCR server 114 may then instruct the ASA server 118 to maintain the regular working hours for the agent and may note the time and date that the agent declined the overtime offer in the MCR database 116. If agent doesn't respond within a certain time interval, the agent GUI module 306 may treat the non-response as a decline and may forward decline information to the MCR server 114. If the agent accepts, the agent GUI module 306 may forward acceptance information to the MCR server 114. The MCR server 114 may forward the acceptance information to the ASA server 118 and to the MCR database 114 for updating the hours worked by the agent. The ASA server 118 may apply overtime rules mapping the hours worked to the overtime rate if the additional hours qualify as overtime hours. For example, the overtime rate may specify that 8 overtime minutes worked may be compensated at 15 non-overtime minutes.

The agent GUI module 306 also may interact with the email GUI module 308, the Network Order Processing GUI module 310, and the Billing GUI module 312 for processing non-real-time tasks assigned to the agent. Modules 306-312 may exchange data with the external systems server 120 for processing the non-real-time tasks. The agent GUI module 306 may automatically hide GUIs presented by the email GUI module 308, the network order processing GUI module 310, and the bill processing GUI module 312 when the agent is not working in one or more of these GUIs.

Figure 4:
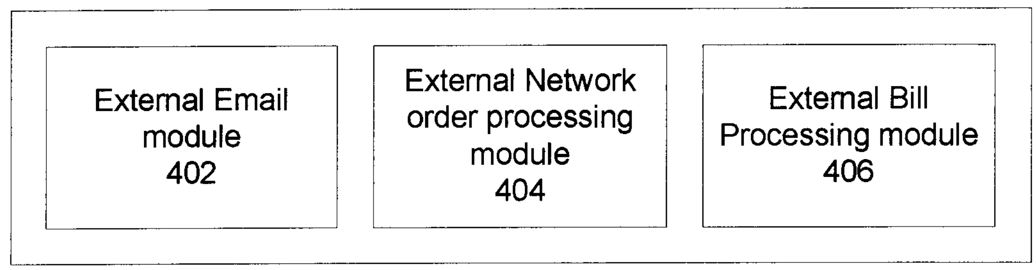
FIG. 4 illustrates exemplary modules included in an external systems server, according to an exemplary embodiment of the present invention.

FIG. 4 illustrates an exemplary embodiment of modules 402-406 implemented at the external systems server 120, according to an exemplary embodiment of the present invention. It is noted that modules 402-406 are exemplary. The functions performed by the modules 402-406, as described herein, are exemplary. The modules 402-406 may be combined, divided, separated, integrated, and/or combinations thereof. The modules 402-406 also may be local or remote to one another. The external systems server 120 may include an external email module 402, an external network order processing module 404, and an external bill processing module 406. The external email module 402, the external network order processing module 404, and the external bill processing module 406 may forward non-real-time messages over the private network 108 to the email GUI module 308, the network order processing GUI module 310, and the bill processing GUI module 312 for processing.

The email processing GUI module 308 may present an email processing GUI to the agent at the agent workstation 110 after the agent is assigned an e-mail task. For example, the email processing GUI may be an eGain interface. The agent may interact with the email processing GUI to respond to an email from a customer.

The network order processing GUI module 310 may present a network order processing GUI to the agent at the agent workstation 110 after the agent is assigned a network order task. For example, the network order processing GUI may be an eCORS interface for processing transactions received via a company's website. ECors may include further classification to a Hold queue and an Incoming queue. Agents may be assigned to work the Hold queue and/or Incoming queue. The Hold queue and the Incoming Queue may defined as mechanisms to store the orders waiting to be processed. The Incoming Queue may include the orders which are simple in nature and may be processed immediately. The Hold queue may store orders needing additional information, a background check, etc., and may be processed when the additional information is available.

The bill processing GUI module 312 may present a bill processing GUI to the agent at the agent workstation 110 after the agent is assigned a bill processing task. For example, the bill processing interface may be a ONE-BILL task permitting a customer to pay their wired and wireless bill at one time. The agent may process payment received from a customer using the bill processing GUI.

Figure 5:
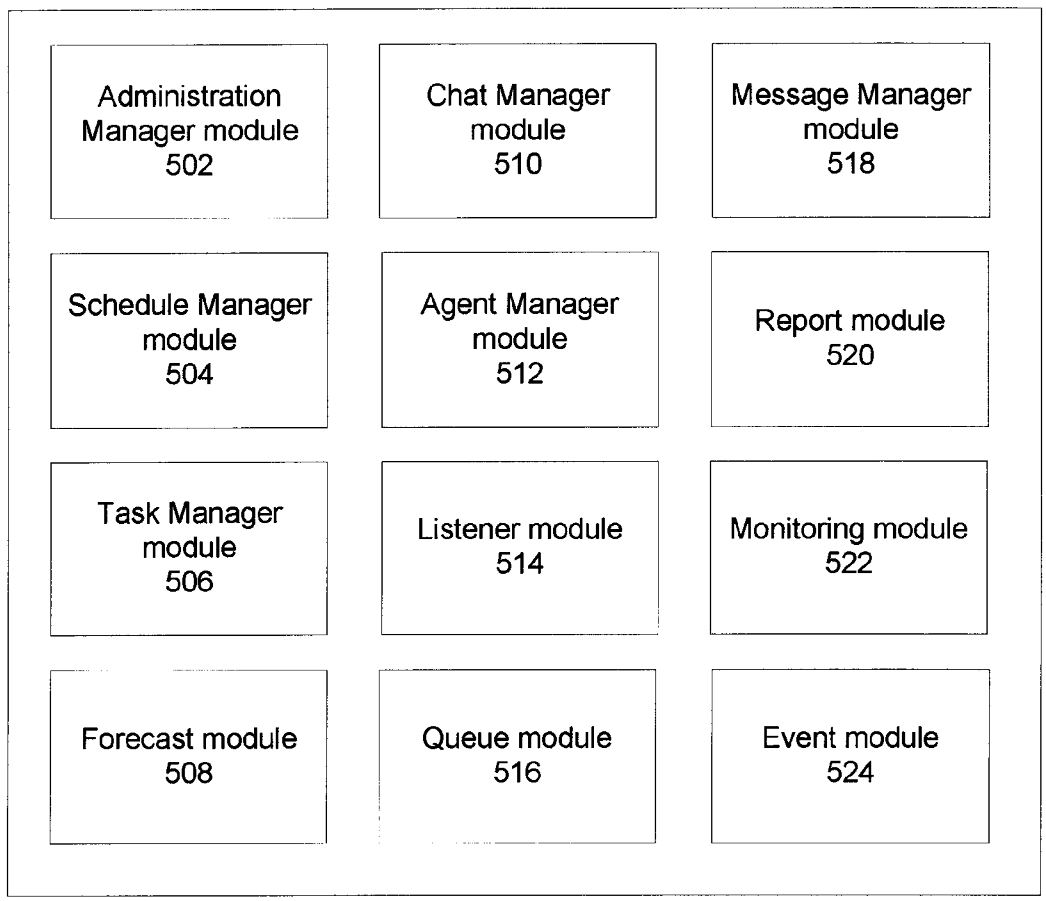
FIG. 5 illustrates exemplary modules included in a multimedia contact routing server, according to an exemplary embodiment of the present invention.

FIG. 5 illustrates various modules implemented at the MCR server 114, according to an exemplary embodiment of the present invention. The MCR server 114 may generate agent status information which may be used to determine whether to assign various tasks to agents at the agent workstations 110, and may generate reports for monitoring performance of the agents. The MCR Server 114 may include an administration manager module 502, a schedule manager module 504, a task manager module 506, a forecast module 508, a chat manager module 510, an agent manager module 512, a listener module 514, a queue module 516, a message manager module 518, a report module 520, a monitoring module 522, and an event module 524. For example, modules 502-512 may be Enterprise JavaBeans that may respond to Java Message Service (JMS) events and modules 514-518 may be Message Driven Beans that may respond to Java Remote Method Invocation (RMI) messages. It is noted that modules 502-524 are exemplary. The functions performed by the modules 502-524, as described herein, are exemplary. The modules 502-524 may be combined, divided, separated, integrated, and/or combinations thereof. The modules 502-524 also may be local or remote to one another.

The listener module 514 may listen for task assignment requests from the call center server 106. When the call center server 106 receives a communication request or a non-real-time message, the URS module 202 may send a task assignment request to the listener module 514 of the MCR server 114. The task assignment request may contain the task type (i.e., non-real-time task, real time task), jurisdiction, and optionally skill level information (e.g., specialist, expert, etc.). Depending on the task type, the listener module 514 may forward the task assignment request to a particular queue in the queue module 516. The queue module 516 may include multiple queues for storing task assignment requests until the task is assigned by the task manager module 506. The queue module 516 may include a task queue that stores non-real-time task assignment requests, a real-time queue that stores real-time task assignment requests, and a MCR queue that stores all other task assignment requests. The MCR queue may prioritize the tasks and may reduce the delay during assignment of a task to an agent.

The task manager module 506 may assign tasks to the agent workstations 110 based on the task assignment request, a task type, an agent profile, and agent status information associated with the agent profile stored in the MCR database 116. The agent profile may identify a skill level of an agent, an ability to process tasks of various types, knowledge of a particular jurisdiction, a type of customer service agent (e.g., eCare Support Specialists, Clerks, Associates, etc.), etc. The agent status information may identify which agents have logged on to their respective agent workstations 110, which agents are currently processing a task and the priority of the task, and a work schedule for each of the logged on agents. The task manager module 506 also may monitor and update the agent status information as each agent completes a task, starts a new task, goes on a break, etc. Additionally, the task manager module 506 may periodically query the ASA server 118 to obtain agent work schedule information (e.g., Monday through Friday, 8:00 am to 4:30 pm) on each of the agents for updating the agent status information.

The task manager module 506 may associate agents with tasks pending in the queues of the queue module 516. The task manager module 506 may assign real-time tasks before non-real-time tasks. The task manager 506 may assign non-real-time tasks based on oldest time in the queue and/or based on any increased priority specified in the priority parameters received from the supervisor workstation 112. The task manager module 506 may periodically query the queue module 516 to determine whether task assignment requests are stored in any of the queues. If any task assignment requests are queued, the task manager module 506 may query the MCR database 116 to identify one or more agent profiles of agents that may process the task based on the task type (e.g., chat session, jurisdiction) and on any skill requests (e.g., expert, etc.), and the agent status information for the identified agent profiles. The task manager module 506 may determine whether to generate assignment information for assigning the task to an agent workstation based on the agent status information.

If no agents are available that meet the criteria or are unavailable due to absence for assigning a task, work schedule, or break, then the task manager module 506 may determine not to assign that task to any agent. The task manager 506 may wait a time interval (e.g., 5 seconds) before again querying the MCR database 116 and/or may proceed to assign the next task pending in the queue. For example, the task manager module 506 may not assign a task if the agent status information indicates that the agent is on an ad-hoc or scheduled break, sick or out for the day, is processing other real-time tasks, or otherwise identified as being unavailable. Also, the task manager module 506 may not forward replies to emails if the agent status information indicates that agent has signed off for the day or is unavailable for any other reason. The task manager module 506 may forward the emails the non-real-time task queue for assignment to another agent.

Once a suitable agent is available, for real-time tasks, the task manager module 506 may generate and forward assignment information to the USR module 202. The assignment information may include identification information identifying an agent workstation for a particular agent with the task assignment request. The USR module 202 may then route the task to the agent workstation 110 based on the assignment information and the task manager module 506 may update the agent status information in the MCR database 116 with the status of the task and the agent (e.g., phone call 134 is assigned to agent X). Also, when an agent is assigned a real-time task, another real-time task may not be assigned to that agent until the previously assigned real-time task has been completed.

For non-real-time tasks, the task manager module 506 may instruct the external system server 120 to forward the non-real-time message to a particular agent workstation 110 and the task manager module 406 may update the agent status information stored in the MCR database 116 with the status of the task and of the agent (e.g., email 934 is assigned to agent Y). However, if the task manager module 506 receives a real-time task assignment request while an agent is processing a non-real-time task, and if the agent profile of the agent satisfies the criteria for processing the real-time task, the task manager module 506 may interrupt the agent's processing of the non-real-time task and may generate assignment information for assigning the real-time task to the agent unless the agent has selected the task pause icon.

Once an assigned task is completed, the agent workstation 110 may forward completed information to the MCR server 114. The MCR server 114 may forward the completed information to the MCR database 116 for updating the agent status information. The updated agent status information may indicate what type of task the agent completed, the jurisdiction of the task, the time required to complete the task, and that the status of the agent is now available to receive a new assigned task.

The administration manager module 502 may support and interact with the administration GUI module 304 over the private network 108. The administration manager module 502 may be the interface between the administration GUI module 304 and the MCR database 116. For example, when a supervisor requests a report from the MCR database 116 or requests to update system or agent parameters, the request may be first sent to a struts framework for formatting, and the struts framework may then return the formatted request to the administration manager module 402. The administration manager module 402 may forward the formatted request to the MCR database 116 to obtain a response and then sends the response back through the struts framework to the administration GUI module 304 via the network 108.

The chat manager module 510 may poll the chat module 210 for chat status information about chat sessions assigned to the agent workstations 110 and may update the agent status information stored in the MCR database 116 based on the chat status information. The chat status information may indicate which agents have been assigned chat sessions, the duration of the chat session, completion of a chat session, and/or combinations thereof.

The forecast module 508 may generate forecast information for identifying a number of uncompleted tasks by task type and jurisdiction, and a status of pending assigned tasks. Periodically, the forecast module 508 may send a forecast request to the queue module 516. The queue module 516 may respond to the forecast request by generating forecast information identifying the number of real-time task requests and the number of non-real-time task requests pending in the respective queues. The forecast module 508 may forward the forecast information to the reporting module 520 for generating a forecast report that may be displayed by the administration GUI module 304 to the supervisor. The supervisor may use the forecast information to determine agent staffing requirements for properly scheduling agent work schedules, to offer additional hours and/or overtime to agents, to assign higher or lower priority to different non-real-time task types and/or jurisdictions based on a backlogs in the non-real-time task queue, and/or combinations thereof.

The schedule manager module 504 may be the interface between ASA server 118 and the MCR server 114. Periodically, the schedule manager module 504 may query the ASA server 118 for agent work schedule information. The ASA server 118 may forward the agent work schedule information to the schedule manager module 504 in a flat file, for example. The schedule manager module 504 may optionally reformat and may forward the schedule information to the call center server 106 for routing real-time communication sessions to agents. The schedule manager module 504 also may forward the schedule information to the MCR database 116 for updating the agent status information identifying the availability of the agents during various time periods.

The event module 524 stores log information in the MCR database 116 about agent events. The event module 524 may receives log information from an EventLogSender class (not shown in diagram). The EventLogSender class may be a logging mechanism for tracking what is occurring in the large scale distributed applications of the system 100 to keep track of each agent's activity.

The MCR database 116 may store agent status information about the agents including agent work schedules, skill levels, login status, active/inactive status (e.g., processing tasks, on a break, etc.), busy/available status (i.e., processing a real-time task, processing a non-real-time task, not processing any task, task pause state), historical information about tasks completed by the various agents, system parameters, agent profiles, supervisor profiles, and/or combinations thereof. The interface to the MCR database 116 may be through a Data Access Object (DAO). The DAO may define a class to support needed database operations (e.g., queries).

The agent manager module 512 may monitor and control the agent GUI module 306. The agent manager module 512 may communicate with the ASA server 118 to instruct the agent GUI module 306 to generate the pop-up windows for alerting the agent when they should be on break, lunch log-outs, in a meeting, training, personal, end of work shift, etc., and to update the agent status information to prevent the task manager module 506 from assigning any tasks to the agent during these scheduled time breaks. If the agent GUI module 306 detects that the agent is still working after a certain time interval has passed since the beginning of the break (e.g., 2 minutes after), the agent GUI module 306 may instruct the GUI of the agent workstation 110 to produce another pop-up window reminder. After the second pop-up window reminder, the agent GUI module 306 may or may not display further reminders.

The agent manager module 512 also may receive login/logout information from the login module 302. The login module 302 may determine a time when an agent logs in and out (e.g., for a work shift, from a break, etc.) and may forward the time to the agent manager module 512. The agent manager module 512 may update the agent status information stored in the MCR database 116 based on the login/logout information. The agent manager module 512 also may detect if then agent is tardy and may instruct the GUI of the agent workstation 110 to produce a pop-up window informing the agent that they are tardy and may have the agent select a tardy acknowledgment icon to close the pop-up window. The pop-up window may prohibit the agent from proceeding with work until the tardy acknowledgment icon is selected, for example.

Additionally, the agent manager module 512 may control an agent's ability to log out at the completion of a work shift. Before an agent is permitted to log out, the agent manager module 512 may query the queue module 416 to determine whether any real-time tasks are pending in the real-time task queue. If pending, then the agent manager module 512 may instruct the agent GUI module 306 to prevent the agent from logging out until all pending calls or chats are completed and to display a pop-up window with an active chats/call status identifier indicating there are active pending chats/calls in the real-time task queue.

The monitoring module 522 may track and monitor agent performance in processing the assigned tasks. The monitoring module 522 may poll the statistics module 206 to identify what current task a specific agent is working on, when the task was assigned, what the duration of the task has been, any scheduled unperformed task(s) assigned to each agent, and/or combinations thereof. For example, the monitoring module 522 may poll the statistics module 206 after a certain time period expires (e.g., once every five seconds). The monitoring module 522 may then update the agent status information in the MCR database 116.

The report module 520 may generate and forward various types of reports to the agent workstation 110 and/or to the supervisor workstation 112. The reports may permit supervisors and agents to view historical and/or real-time performance data of the agents. The historical and/or real-time performance data may correspond to a particular time span (e.g., seasonal, months, weeks, daily, and hours, etc.), by a task type (e.g., calls, emails, chats, fallout orders, and onebill orders), by jurisdiction, by agent, by agents assigned to the supervisor, by desired groups of agents, by all agents, by skill level, by service level, and/or by combinations thereof. The reports may be generated for a specific time interval to correlate work volumes with external events, such as a promotion, for example. The report module 520 may receive a report query from the supervisor workstations 112 for reports for tracking agent performance. The report module 520 may generate a database query to retrieve the agent status information requested in the report query from the MCR database 116.

The report module 520 may then forward the requested agent status information to the supervisor workstation 112 in a report. The administration GUI module 304 may display the report to the supervisor and also may display various alarms. The alarms may indicate agent performance in relation to performance thresholds specified in the system parameters. The thresholds may indicate when an agent has failed to comply with a performance target (e.g., respond to a particular task type within a certain time interval). The thresholds may be set up for monitoring performance of groups of one or more agents, by task type, by jurisdiction, by skill level, and/or combinations thereof. For example, the system parameters may specify a performance target of 3 minutes for calls may be set for NJ customers and a performance target of 4 minutes may be set for NY customers. The alarm may trigger for calls from NY longer than 4 minutes and for calls from NJ customers longer than 3 minutes.

The alarms may be color-coded indicating compliance with the thresholds. For example, the color-coded alarms may correspond to a percentage under or over a performance target in processing time for each task type (e.g., green for tasks completed within a performance target, yellow for 1-10% over the performance target, red for more than 10% over the performance target). The alarms may be based on aggregate agent performance, on a performance of a subset of all agents, which may be a single agent, or a performance of agents assigned to a particular supervisor. Color-coded alarms may indicate performance in responding to each of calls, emails, chats, fallout orders, and onebill orders, for example. The GUI may display any threshold violations and the administration GUI module 304 may request that the report module 520 forward additional reports for updating the alarms in real-time.

Agents also may instruct the agent GUI module 306 to generate a report query querying the report module 520 for an agent's personal performance. The agent may specify a time interval in the reporting query (e.g., request for today's performance, last week's performance, year to date performance, etc.). The report module 520 may receive the reporting query and may obtain agent status information from the MCR database 116. The report module 520 may forward the report to the agent workstation 110 for display to the agent.

The following describes various exemplary reports that may be generated by the report module 520. The report module 520 may generate a volume report, a workload report, a daily staffing report, a Real Time Adherence (RTA) percent (%) Report, a performance report, a log-in/log-out report, a detailed agent report, an overtime equalization report, a monthly report, and an agent personal report. The report module 520 may receive a query for the report from the agent workstation 110 and/or the supervisor workstation report 112 specifying the desired report (e.g., volume report query, workload report query, etc.). Also, the agent may or may not be able to query for all of the reports. For example, the agent may be permitted to obtain agent personal reports, whereas the supervisor may obtain any of the reports.

A volume report may be used to track aggregate performance of the agents. The volume reports may be segmented by: time interval; jurisdiction; number of emails sent, closed, or rerouted; number of calls handled; number of calls offered; number of chats handled; number of chats offered; number of onebill transactions completed; number of fallout orders completed; and/or combinations thereof.

The report module 520 may generate workload reports, which also may be referred to as queue reports. Workload reports may indicate a number of queued uncompleted tasks for all task types for all jurisdictions, a length of time that each task has been queued, an average time length for all queued tasks, and a number of completed tasks. The number of uncompleted tasks may be segmented into a number of new uncompleted tasks received today and a number of old uncompleted tasks uncompleted from other previous days. The workload reports may include historical data and present data. For example, the workload report may indicate a number of uncompleted tasks from previous days (e.g., number of fallout orders, onebill orders, emails, etc.) by jurisdiction, a number of uncompleted tasks received today, and a number of tasks completed today. The report module 520 may forward periodically or upon request workload report updates to the administration module GUI 306. The administration module GUI 306 may present a static display to the supervisor that may be updateable via an "update" button with the age of unassigned queued tasks being displayed in one-hour increments and with unassigned queued tasks older than 24 hours being displayed in one day increments, for example.

The report module 520 may generate a daily staffing report to forecast staffing needs for processing various tasks. The forecast in the daily staffing report may be based on the total volumes for each task type, an average handling time (AHT), and a service level. For example, an email queue for the NY jurisdiction may contain 200 emails at the time the daily staffing report is run with an average age of 6 hours. For a service level of responding within 8 hours and an AHT of 10 emails/hour/agent, the forecast may indicate that 10 agents may be needed for processing the emails in the email queue to meet the service level. Based on the availability of agents, the forecast may be used to offer additional working hours or overtime if needed to comply with the service level.

The report module 520 may permit the supervisor to receive a Real Time Adherence (RTA) percent (%) Report. The RTA % Report, which also may be referred to as a schedule compliance report, may show the percentage of the time that an agent has adhered to the agent's work schedule. After receiving a RTA % report request from the supervisor workstation 112, the reporting module 308 may query the MCR database 116 for agent status information to determine at what times agent logs into and out of the login module 302. For example, the agent status information may indicate at what times the agent logs in and out for a work shift, breaks, lunch, training, meetings, personal time, and/or combinations thereof. The reporting module 308 may forward the RTA % report to the supervisor workstation 112 for review by the supervisor. The supervisor may use the agent schedule report to identify the performance of one or more agents in complying to the agent's work schedule (e.g., Monday to Friday, 8:00 am to 4:30 pm) over one or more time intervals (e.g. one month). For example, the report may include activities of the current day or one or more past days depending on the selected time interval. The reporting module 308 also may include the amount of over-time worked by each agent for compliance with any Union agreements.

The report module 520 may generate a performance statistics report upon receiving a performance query from the supervisor workstation 112. The performance statistics report may include performance data for determining agent and supervisor performance, and may permit comparison by agent, comparison by supervisor, personal time, all task types, failure to respond, and/or combinations thereof. The performance data may be presented in a spreadsheet form, and may be sorted by columns and rows, for example.

For each agent, the log-in/log-out report may identify a work shift start and end time, log-in time, log-out time, lunches, breaks, training, meetings, development time with supervisor, personal time, and/or combinations thereof.

The detailed agent report may identify agent performance over one or more time intervals (e.g., daily, weekly, monthly, yearly, etc.), by task type, average handling time (AHT), AHT by task type, number of threshold violations, total work shift schedule percentage adherence, number of tasks per hour, tasks per hour by task type, number of late returns from work breaks and from lunch breaks, and/or combinations thereof. Each agent may be listed in the detailed agent report under their supervisor with a sub-total under each supervisor-section for their group of agents.

For a desired time interval (e.g., day, month, year, etc.), the overtime equalization report may include: a number of hours worked by agent, number of hours declined by agent, number of hours offered by agent, number of times overtime was offered to each agent, and/or combinations thereof. The performance data may be presented in spreadsheet form, and may be sorted by columns and rows, for example.

The monthly report may include agent statistics by month for one or more agents including: a monthly total number of tasks performed by task type (e.g., volume of each contact type handled, AHT, and Totals), year-to-date (YTD) and month-to-date (MTD) productivity including tasks per hour, attendance data over a time interval (e.g., tardiness and absences for the year to date or over a rolling window over 12 months), an observation score from supervisor's aide (e.g., a grading system for an agent's performance), a work schedule adherence percentage (i.e., percentage of the time an agent adheres to their work schedule), and/or combinations thereof. The agent monthly statistic report data in the agent monthly statistic report may be available over a rolling time interval, and may be archived for dates outside of the rolling time interval. The archived agent monthly statistic report data may be available over a rolling archive time interval. Once outside of the rolling archive time interval, the archived agent monthly statistic report data may be deleted, if desired, or may be retained. For example, the agent monthly statistic report data may be available for a rolling 13 month window. Beyond 13 months, data may be archived as agent monthly statistic report data for 24 months. Beyond 24 months, the agent monthly statistic report data may be deleted, if desired.

The agent personal performance reports may identify various performance metrics for the agent. The agent personal performance report may identify the agent's Contacts Per Hour (CPH), productivity by task type, number of remaining tasks, number of late returns from break, amount of personal time, and/or combinations thereof. The agent performance report may be updated in real time and may include performance data over an agent defined time interval. The CPH productivity may identify the agent's productivity by task type over a time period (e.g., hour, day, month, year, etc.) and the agent's average handling time (AHT) by task type. The agent personal performance report also may include the CPH, AHT, and productivity by task type for the team to which the agent belongs. Additionally, the agent personal performance report may identify the number of remaining tasks by type for the call center and for a particular jurisdiction. Further, the agent personal performance report may identify the number of times the agent was late from work breaks, lunch, and left early before the end of the agent's work shift, any used or remaining personal time (e.g., vacation, sick leave, etc.), and/or combinations thereof. The report module 520 also may forward the agent personal performance report to the supervisor workstation 112.

It is noted that the reports discussed above describe various types of information being included in the respective reports. The reports, however, are exemplary. The information and/or the reports may be divided and/or combined into other reports.

Figure 6:
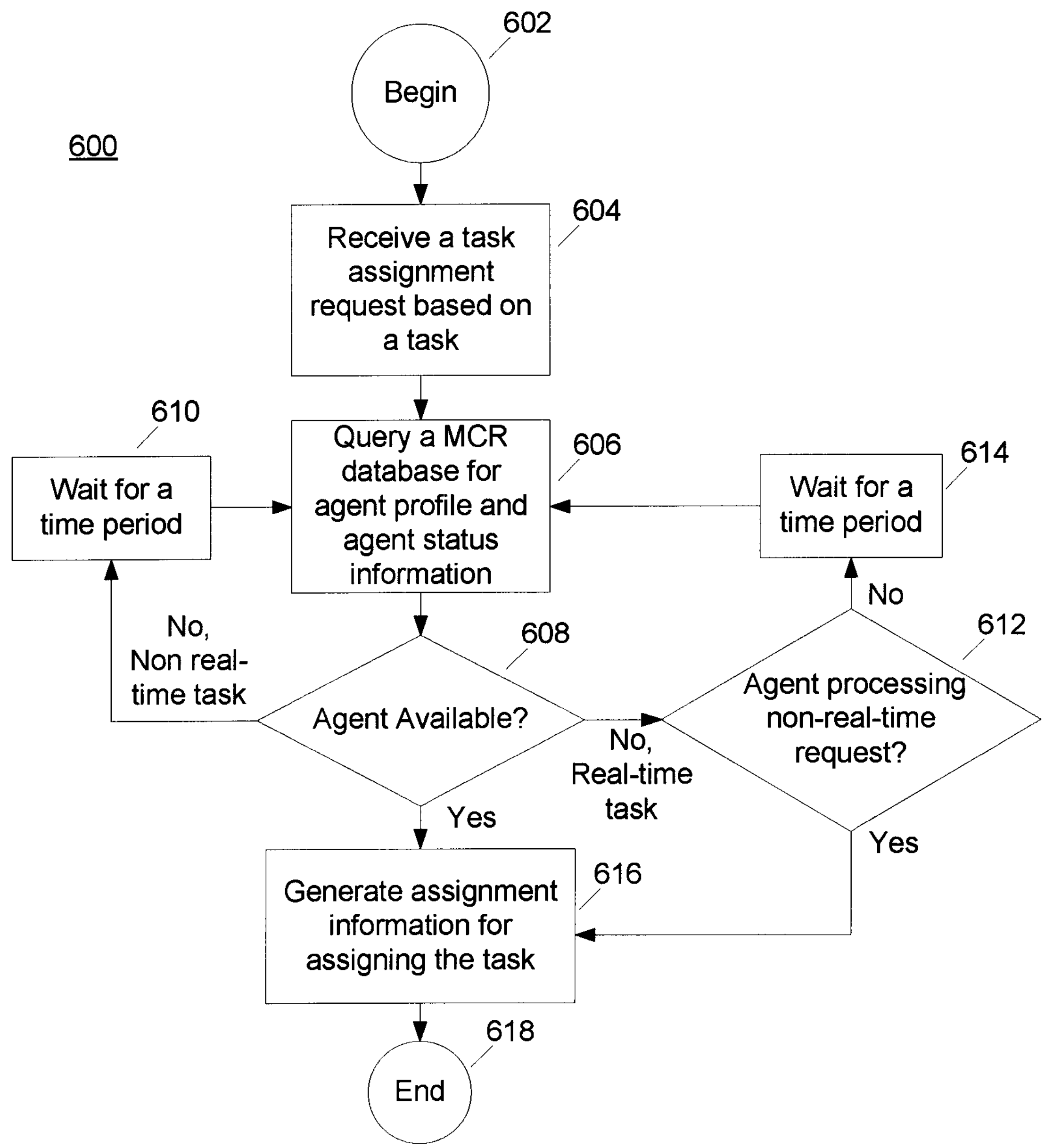
FIG. 6 illustrates an exemplary flow diagram for receiving and processing task assignment requests, according to an exemplary embodiment of the present invention.

FIG. 6 illustrates an exemplary flow diagram 600 for receiving tasks and for assigning the tasks to an agent, according to an exemplary embodiment of the present invention. The flow diagram 600 may begin at 602 and may continue to 604.

In 604, the queue module 516 of the MCR server 114 may receive a task assignment request from the call center server 106 and may store the task assignment request in the real-time task queue or in the non-real-time task queue. The queue module 516 may respond to queries from the task manager module 506 on any pending task assignment requests.

In 606, the task manager module 506 may generate a query for the MCR database 116 based on one or more of the tasks pending in either the real-time task queue or the non-real-time task queue. The query may include a task type of the pending tasks and optionally a skill request for identifying one or more agent profiles and agent status information for the identified agent profiles.

In 608, the task manager module 506 may determine whether a suitable agent is available for processing any of the pending task assignment requests based on the agent status information. The task manager module 506 may determine that the agent may process the pending task assignment request if the agent profile indicates that the skills listed for the agent may be suitable for processing the task type of the pending task assignment request and the agent status information indicates that the agent is available. For example, the pending task assignment request may request a chat session with an expert on a particular jurisdiction. The tasks manager 506 may identify the agent profiles of all agents meeting the requirements of the pending task assignment request who are not currently assigned other real-time tasks. For a non-real-time task assignment request, if no agents are available, the flow diagram 600 may continue to 610. For a real-time task assignment request, if no agents are available, the flow diagram 600 may continue to 612. If an agent is available for either a real-time task assignment request or a non-real-time task assignment request, then the flow diagram 600 may continue to 616.

In 610, the task manager module 506 may wait for a time period and may then return to 606. During the time interval, the agent status information in the MCR database 116 may be updated with completed information and with login information that may indicate that agents have completed or are newly available to process the pending task assignment request.

In 612, the task manager module 506 may process the agent status information to determine whether any agents are currently processing non-real-time tasks that meet the criteria of the real-time task assignment request. If not, then the flow diagram may continue to 614. If yes, then the task manager module 506 may interrupt the non-real-time task and the flow diagram 600 may continue to 616.

In 614, the task manager module 506 may wait for a time period and may then return to 606. During the time interval, the agent status information in the MCR database 116 may be updated with completed information and with login information that may indicate that agents have completed or are newly available to process the pending task assignment request.

In 616, the task manager module 506 may generate assignment information. The assignment information may include identification information identifying an agent workstation 110 of a particular agent and the pending task assignment request. For real-time requests, the task manager module 506 may include the oldest pending task assignment in the assignment information. The task manager module 506 may then forward the assignment information to the call center server 106, which may route the pending communication session associated with the real-time task to the identified agent workstation 110. For non-real-time requests, the task manager module 506 may include the oldest pending non-real-time task assignment request in the assignment information if no priority has been assigned to non-real-time tasks by the supervisor. If priority has been assigned, then the assignment information may include the oldest pending non-real-time task assignment request with the highest priority to the agent. The task manager module 506 may then forward the assignment information to the external systems server 120, which may forward the pending non-real-time task to the identified agent workstation 110. The flow diagram 600 may continue to 618 and end.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method comprising:

processing, at a multimedia contact routing server, a real-time task assignment request comprising a task type corresponding to a task;

querying a database connected to the multimedia contact routing server based on the real-time task assignment request and on the task type to identify an agent profile and agent status information for the identified agent profile, the agent profile comprising identification information to identify an agent workstation;

generating, using the multimedia contact routing server, assignment information for assigning the real-time task to the agent workstation based on the agent status information when the agent status information indicates the agent is processing a non-real-time task;

transmitting updated agent status information to the database to indicate the agent is processing a real-time task;

determining, using the multimedia contact routing server, that the real-time task is still pending with the assigned agent; and performing, at the multimedia contact routing server, a management action in response to the determination that the real-time task is still pending.

2. The method of claim 1, wherein the agent profile comprises one or more skill level parameters.

3. The method of claim 1, further comprising identifying a task priority for the task.

4. The method of claim 1, further comprising processing, the multimedia contact routing server, a report request;

querying the database connected to the multimedia contact routing server based on the report request; and generating, the multimedia contact routing server, a report.

5. The method of claim 4, further comprising forwarding the report to the agent workstation or a supervisor workstation.

6. The method of claim 5, further comprising adjusting task priority based on the report.

7. The method of claim 4, wherein the report is a performance report for an agent over a time span.

8. The method of claim 4, wherein the report identifies a number of tasks completed.

9. The method of claim 4, wherein the report identifies an average time of task completion.

10. The method of claim 4, wherein the report identifies a number of tasks performed by task type.

11. The method of claim 4, wherein the report identifies compliance with a work schedule.

12. The method of claim 4, wherein the report includes forecast information for forecasting a number of available agent work hours.

13. A non-transitory computer readable media comprising code that when executed by the multimedia contact routing server cases the multimedia contact routing server to perform the method of claim 1.

14. The method of claim 1, wherein the management action includes transmitting a performance alert to the agent workstation indicating that an assigned real-time task has not been completed within a designated time interval.

15. The method of claim 1, wherein the management action includes transmitting a performance alert to the agent workstation indicating that an assigned non-real-time task has not been completed within a designated time interval.

16. The method of claim 1, further comprising polling a statistics module at the multimedia contact routing server to determine current assignment information associated with the agent workstation.

17. The method of claim 16, wherein the polling occurs at a predetermined interval and the results of the polling are stored in the database as updated agent status information.

18. The method 1, further comprising generating new assignment information for the non-real-time task based on the updated agent status information.

19. The method of claim 1, wherein the management action includes transmitting instructions to the agent to prevent the agent from logging out until the real-time task is completed.

20. The method of claim 1, wherein the management action includes tracking agent performance in processing the real-time task.

21. An apparatus comprising:

a queue module housed in a multimedia contact routing server to queue a real-time task assignment request corresponding to a real-time task;

a task manager module communicatively coupled to the queue module to:

process the real-time task assignment request to identify a task type, the task manager module to query a database based on the real-time task assignment request and on the task type to obtain an agent profile and agent status information for the identified agent profile, the agent profile comprising identification information to identify an agent workstation, and generate assignment information for assigning the real-time task to the agent workstation based on the agent status information when the agent status information indicates an agent is processing a non-real-time task; and an agent manager module connectively coupled to the task manager module to:

determine that the real-time task is still pending with the assigned agent, and perform a management action in response to the determination that the real-time task is still pending.

22. A system comprising:

a database to store an agent profile and agent status information associated with the agent profile;

a call center server to forward a real-time task assignment request corresponding to a real-time task;

a multimedia contact routing server communicatively coupled to the call center server and to the database, the multimedia contact routing server comprising:

a queue module to store the real-time task assignment request in a queue;

a task manager module communicatively coupled to the queue module to:

process the real-time task assignment request to identify a task type and to query a database based on the task assignment request and on the task type to obtain the agent profile and the agent status information, the agent profile comprising identification information to identify an agent workstation, and generate assignment information for assigning the real-time task to the agent workstation based on the agent status information; and an agent manager module connectively coupled to the task manager module to:

determine that the real-time task is still pending with the assigned agent, and perform a management action in response to the determination that the real-time task is still pending.

* * * * *